(12) United States Patent
Hauck et al.

(10) Patent No.: US 6,309,792 B1
(45) Date of Patent: Oct. 30, 2001

(54) IR-SENSITIVE COMPOSITION AND USE THEREOF FOR THE PREPARATION OF PRINTING PLATE PRECURSORS

(75) Inventors: Gerhard Hauck; Celin Savariar-Hauck, both of Badenhausen; Hans-Joachim Timpe, Osterode/Harz, all of (DE); Paul R. West, Fort Collins; Heidi M. Munnelly, Windsor, both of CO (US)

(73) Assignee: Kodak Polychrome Graphics LLC, Norwalk, CT (US)

( * ) Notice: Subject to any disclaimer, the term of this patent is extended or adjusted under 35 U.S.C. 154(b) by 0 days.

(21) Appl. No.: 09/690,898

(22) Filed: Oct. 17, 2000

Related U.S. Application Data

(63) Continuation of application No. PCT/EP00/01349, filed on Feb. 18, 2000.

(51) Int. Cl.$^7$ ........................................................ G03C 1/76
(52) U.S. Cl. ...................... 430/270.1; 430/281.1; 430/302; 101/456; 101/463.1
(58) Field of Search ........................... 430/270.1, 281.1, 430/288.1, 302, 919, 926; 101/456, 457, 463.1

(56) References Cited

U.S. PATENT DOCUMENTS

| | | | |
|---|---|---|---|
| 4,939,069 | * 7/1990 | Kawabata et al. | 430/281 |
| 5,227,279 | * 7/1993 | Kawabata | 430/281 |
| 5,368,990 | * 11/1994 | Kawabata et al. | 430/281.1 |
| 5,496,903 | 3/1996 | Watanabe et al. | 526/204 |
| 5,629,354 | * 5/1997 | West et al. | 522/25 |
| 5,759,742 | 6/1998 | West et al. | 430/278.1 |
| 5,821,030 | 10/1998 | West et al. | 430/276.1 |
| 5,888,700 | * 3/1999 | West et al. | 430/302 |
| 5,914,215 | * 6/1999 | West et al. | 430/278.1 |
| 5,942,372 | * 8/1999 | West et al. | 430/281.1 |

FOREIGN PATENT DOCUMENTS

| | | |
|---|---|---|
| 0522175 | 1/1993 | (EP) . |
| 672 954-A2 | * 9/1995 | (EP) . |
| 0730201 | 9/1996 | (EP) . |
| 0795790 | 9/1997 | (EP) . |
| 889 363-A1 | * 1/1999 | (EP) . |
| 1 093 934-A1 | * 4/2001 | (EP) . |
| 401126302-A | * 5/1989 | (JP) . |
| 405301910-A | * 11/1993 | (JP) . |
| 41114306-A | * 5/1999 | (JP) . |

* cited by examiner

Primary Examiner—Janet Baxter
Assistant Examiner—Barbara Gilmore
(74) Attorney, Agent, or Firm—Baker Botts L.L.P.

(57) ABSTRACT

The present invention relates to IR-sensitive compositions containing an initiator system comprising:

(a) at least one compound capable of absorbing IR light
(b) at least one compound capable of producing radicals and
(c) at least one polycarboxylic acid comprising an aromatic moiety substituted with a heteroatom selected from N, O and S and also at least two carboxyl groups wherein at least one of the carboxyl groups is bonded to the heteroatom via a methylene group.

These compositions are inter alia extraordinarily suitable for the manufacture of printing plates.

32 Claims, No Drawings

IR-SENSITIVE COMPOSITION AND USE THEREOF FOR THE PREPARATION OF PRINTING PLATE PRECURSORS

This application is a continuation of PCT/EP00/01349, filed Feb. 18, 2000 which is incorporated by reference herein.

BACKGROUND OF THE INVENTION

The present invention relates to initiator systems and IR-sensitive compositions containing them which, inter alia, are extraordinarily suitable for the manufacture of printing plate precursors which can be imagewise exposed with IR-radiation.

Nowadays, radiation-sensitive compositions usable particularly for high-performance printing plate precursors must fulfill high requirements.

The discussion of improving the properties of radiation-sensitive compositions and thus also of the corresponding printing plate precursors essentially deals with two different ways. One of them deals with the improvement of the properties of the radiation-sensitive components in the compositions (frequently negative diazo resins or photoinitiators), the other one with the search for novel polymeric compounds ("binders") which are to control the physical properties of the radiation-sensitive layers. The first way is of particular importance if the sensitivity of printing plate precursors is to be adjusted to certain ranges of electromagnetic radiation. Also, the shelf-life and radiation-sensitivity of the materials are strongly influenced by the nature of such initiator systems.

The latest developments in the field of printing plate precursors deal with radiation-sensitive compositions which can be imagewise exposed by means of lasers or laser diodes. This type of exposure does not require films as inter-mediate information carriers since lasers can be controlled by computers.

High-performance lasers or laser diodes which are used in commercially available image-setters emit light in the wavelength ranges of between 800 to 850 nm and between 1060 and 1120 nm, respectively. Therefore, printing plate precursors, or initiator systems contained therein, which are to be imagewise exposed by means of such image-setters have to be sensitive in the near IR range. Such printing plate precursors can then basically be handled under daylight conditions which significantly facilitates their production and processing. There are two different possibilities of producing radiation-sensitive compositions for such printing plates.

For negative printing plates, radiation-sensitive compositions are used wherein after an imagewise exposure the exposed areas are cured. In the developing step only the unexposed areas are removed from the substrate. For positive printing plates, radiation-sensitive compositions are used whose exposed areas dissolve faster in a given developing agent than the non-exposed areas. This process is referred to as photosolubilization.

However, with regard to the radiation-sensitive compositions in positive systems, there is a certain dilemma since for a high number of copies crosslinked polymers are needed. However, such products are insoluble in the solvents or solvent mixtures suitable for the plate coating so that again non-crosslinked or only slightly crosslinked starting products are needed. The necessary crosslinking can then be achieved by preheating steps which can be carried out at various stages of the plate processing.

A positive system is described in EP-A-0 819 980 where it is assumed that the non-image areas are formed by a reaction of the formed acid with carbon black. The image areas are only formed during a preheating step; for a high number of copies the image areas have to be baked.

Another positive system is described in U.S. Pat. No. 5,658,708. The necessary crosslinking of the layer is already carried out during the drying step of the coating. However, for that purpose the system has to be treated at 120° C. for 10 minutes whereby chemical processes take place which eventually lead to crosslinking. However, the required relatively long heating periods at such high temperatures represent an unacceptable waste of time in today's typical fully automated plate production lines. Baking does not lead to an increase in the number of copies since the crosslinking is partly undone.

Documents EP-A-0 823 327 and WO97/39894 also describe positive compositions. As is the case with many positive systems, they entail the disadvantage that a complicated conditioning step is necessary in order to ensure a sufficient shelf-life of the plates. Furthermore, a baking step is required to obtain high numbers of copies and a good solvent resistance.

Plates which can be imagewise exposed with IR lasers are furthermore known from EP-A-0 672 544, EP-A-0 672 954 as well as U.S. Pat. No. 5,491,046 and EP-A-0 819 985. These plates are negative-working and after imagewise exposure they require a preheating step within a very narrow temperature range which only causes a partial crosslinking of the image layer. In order to meet the highest requirements regarding the number of copies and to show sufficient resistance to printing chamber chemicals an additional heating step—what is referred to as baking—is carried out during which these layers are crosslinked further.

All the systems described so far have the additional disadvantage that a relatively high laser performance ($\geq 150$ mJ/cm$^2$) is required; for some applications (e.g. newsprinting) this represents a disadvantage since the provision of the necessary number of exposed printing plates within a short period of time is problematic.

U.S. Pat. No. 4,997,745 describes photosensitive compositions comprising a dye absorbing in the visible range and a trihalomethyl-s-triazine compound. However, these compositions are not sensitive in the IR-range and meet neither today's high requirement regarding photosensitivity nor that of a long shelf-life. In U.S. Pat. No. 5,496,903 and DE-A-196 48 313 photosensitive compositions are described which in addition to a dye absorbing in the IR range comprise borate co-initiators; also, halogenated s-triazines are described as further co-initiators. Although these compositions show an improved photosensitivity, the thus produced printing plates do not meet the present-day requirement of a long shelf-life. After only one month of storage at room temperature, the entire layer of the printing plate has cured to such a degree that an image can no longer be created after exposure and developing of the plate.

Further photopolymerizable compositions with initiator systems are described in U.S. Pat. Nos. 5,756,258, 5,545, 676, JP-A-11-038633, JP-A-09-034110, U.S. Pat. No. 5,763, 134 and EP-B-0 522 175.

Radiation-sensitive compositions which show both a high degree of radiation sensitivity and a sufficiently long shelf-life when used in the manufacture of printing plate precursors are presently only known in connection with UV-absorbing dyes (EP-A-0 730 201). However, printing plate precursors using such compositions have to be manufactured and processed under darkroom conditions and cannot be imagewise exposed by means of the above-mentioned lasers or laser diodes. Particularly the fact that they cannot be processed in daylight limits their possibilities of application.

SUMMARY OF THE INVENTION

It is therefore the object of the present invention to provide IR-sensitive compositions which allow the manufacture of negative printing plate precursors having a long shelf-life, providing a continuously high number of copies and a high degree of resistance to developing chemicals, and which are additionally characterized by a high IR sensitivity and resolving power as well as processability in daylight.

Another object underlying this invention is the use of such IR-sensitive compositions for preparing negative printing plate precursors.

These objects are achieved by an IR-sensitive composition comprising in addition to a polymeric binder a free radical polymerizable system consisting of at least one member selected from unsaturated free radical polymerizable monomers, oligomers which are free radical polymerizable and polymers containing C=C bonds in the back bone and/or in the side chain groups and an initiator system, wherein the initiator system comprises the following components:

(a) at least one compound capable of absorbing IR radiation (b) at least one compound capable of producing radicals and (c) at least one polycarboxylic acid comprising an aromatic moiety substituted with a heteroatom selected from N, O and S and also at least two carboxyl groups wherein at least one of the carboxyl groups is bonded to the heteroatom via a methylene group.

DETAILED DESCRIPTION OF THE PREFERRED EMBODIMENTS

Useful infrared absorbing compounds typically have a maximum absorption wavelength in some part of the electromagnetic spectrum greater than about 750 nm; more particularly, their maximum absorption wavelength is in the range from 800 to 1100 nm.

Preferably the at least one compound (a) is selected from triarylamine dyes, thiazolium dyes, indolium dyes, oxazolium dyes, cyanine dyes, polyaniline dyes, polypyrrole dyes, polythiophene dyes and phthalocyanine pigments.

It is more preferred that component (a) is a cyanine dye of the formula (A)

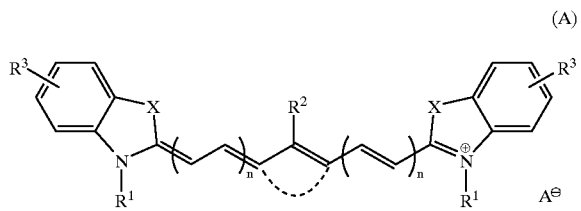

(A)

wherein:
each X independently represents S, O, NR or C(alkyl)$_2$;
each R$^1$ independently is an alkyl group, an alkylsulfonate or an alkylammonium group;
R$^2$ represents hydrogen, halogen, SR, SO$_2$R, OR or NR$_2$;

each R$^3$ independently represents a hydrogen atom, an alkyl group, COOR, OR, SR, NR$_2$, a halogen atom or an optionally substituted benzofused ring;
A$^-$ represents an anion;
- - - represents an optional carbocyclic five- or six-membered ring;
each R independently represents hydrogen, an alkyl or aryl group;
each n independently is 0, 1, 2 or 3.

If R$^1$ is an alkylsulfonate group A$^-$ can be absent (formation of an inner salt); otherwise an alkali metal cation is necessary as counterion. If R$^1$ is an alkyl-ammonium group a second anion is necessary as counterion; this second anion may be the same as A$^-$ or a different one.

Compound (b) preferably is selected from polyhaloalkyl-substituted compounds and azinium compounds.

In the present free radical polymerizable system the radical is formed between component (a) and component (b) and the polycarboxylic acid. In order to achieve a high degree of radiation sensitivity, the presence of all three components is indispensable. It was found that completely radiation-insensitive compositions were obtained when component (b) was missing. The polycarboxylic acid is necessary to obtain the required thermal stability. If the polycarboxylic acid is replaced for example by compounds having a mercapto group or by ammonium borates the radiation sensitivity can be slighty decreased and the thermal stability of such compositions can be insufficient.

Basically all polymers or polymer mixtures known in the art can be used as polymeric binders, for example acrylic acid copolymers and methacrylic acid copolymers. Preferably, the polymers have a weight-average molecular weight in the range of 10,000 to 1,000,000 (determined by means of GPC). In view of possible problems occurring in connection with ink acceptance during the printing process, it is preferred that the used polymer has an acid number of >70 mg KOH/g, or, when polymer mixtures are used, that the arithmetic average of the individual acid numbers be >70 mg KOH/g. A polymer or polymer mixture with an acid number of >110 mg KOH/g is preferred; especially preferred is an acid number between 140 and 160 mg KOH/g. The content of the polymeric binder in the IR-sensitive composition preferably accounts for 30 to 60 wt.-%, more preferably 35 to 45 wt.-%, based on the total solids content of the IR-sensitive composition.

As unsaturated free radical polymerizable monomers or oligomers, use can be made of for example acrylic or methacrylic acid derivatives with one or more unsaturated groups, preferably esters of acrylic or methacrylic acid in the form of monomers, oligomers or prepolymers. They may be present in solid or liquid form, with solid and highly viscous forms being preferred. The compounds suitable as monomers include for instance trimethylol propane triacrylate and methacrylate, pentaerythrite triacrylate and methacrylate, dipentaerythritemono hydroxy pentaacrylate and methacrylate, dipentaerythrite hexaacrylate and methacrylate, pentaerythrite tetracrylate and methacrylate, ditrimethylol propane tetracrylate and methacrylate, diethyleneglycol diacrylate and methacrylate, triethyleneglycol diacrylate and methacrylate or tetraethyleneglycol diacrylate and methacrylate. Suitable oligomers and/or prepolymers are urethane acrylates and methacrylates, epoxide acrylates and methacrylates, polyester acrylates and methacrylates, polyether acrylates and methacrylates or unsaturated polyester resins.

Besides monomers and oligomers polymers having C=C bonds in the back bone and/or in the side chains can be used.

Examples thereof include: reaction products of maleic anhydride-olefin-copolymers and hydroxyalkyl(meth) acrylates, polyesters containing an allyl alcohol group, reaction products of polymeric polyalcohols and isocyanate (meth)acrylates, unsaturated polyesters and (meth)acrylate terminated polystyrenes, poly(meth)acrylics and polyethers.

The weight ratio of the free radical polymerizable monomers or oligomers is preferably 35 to 60 wt.-%, more preferably 45 to 55 wt.-%, based on the total solids content of the IR-sensitive composition.

The initiator system of the present invention comprises as an essential component a compound capable of absorbing IR radiation. This IR absorber is preferably selected from triarylamine dyes, thiazolium dyes, indolium dyes, oxazolium dyes, cyanine dyes, polyaniline dyes, polypyrrole dyes, polythiophene dyes, and phthalocyanine pigments. More preferred are IR dyes of the formula (A)

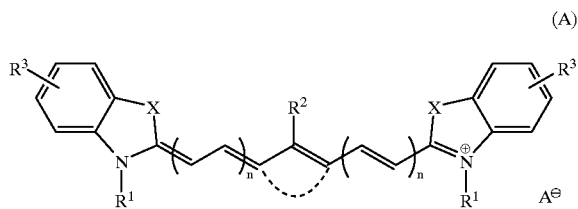

(A)

wherein:
each X independently represents S, O, NR or C(alkyl)$_2$;
each $R^1$ independently is an alkyl group, an alkylsulfonate or an alkylammonium group;
$R^2$ represents a halogen atom, SR, SO$_2$R, OR or NR$_2$;
each $R^3$ independently represents a hydrogen atom, an alkyl group, COOR, OR, SR, NR$_2$, a halogen atom or an optionally substituted benzofused ring;
A$^-$ represents an anion;
- - - represents an optional carbocyclic five- or six-membered ring;
each R independently represents hydrogen, an alkyl or aryl group
each n independently is 0, 1, 2 or 3.

These dyes absorb in the range of 750 to 1100 nm; dyes of the formula (A) which absorb in the range of 810 to 860 nm are preferred.

X is preferably a C(alkyl)$_2$ group.

$R^1$ is preferably an alkyl group with 1 to 4 carbon atoms.

$R^2$ is preferably SR.

$R^3$ is preferably a hydrogen atom.

R is preferably an alkyl or aryl group; especially preferred is a phenyl group.

The broken line preferably represents the rest of a ring with 5 or 6 carbon atoms.

The counterion A– is preferably a chloride ion or a tosylate anion.

Especially preferred are IR dyes with a symmetrical formula (A). Examples of such especially preferred dyes include:
2-[2-[2-phenylsulfonyl-3-[2-(1,3-dihydro-1,3,3-trimethyl-2H-indol-2-ylidene)-ethylidene]-1-cyclohexen-1-yl]-ethenyl]-1,3,3-trimethyl-3H-indoliumchloride,
2-[2-[2-thiophenyl-3-[2-(1,3-dihydro-1,3,3-trimethyl-2H-indol-2-ylidene)-ethylidene]-1-cyclohexen-1-yl]ethenyl]-1,3,3-trimethyl-3H-indoliumchloride,
2-[2-[2-thiophenyl-3-[2-(1,3-dihydro-1,3,3-trimethyl-2H-indol-2-ylidene)-ethylidene]-1-cyclopenten-1-yl]-ethenyl]-1,3,3-trimethyl-3H-indoliumtosylate,
2-[2-[2-chloro-3-[2-ethyl-(3H-benzthiazole-2-ylidene)-ethylidene]-1-cyclohexen-1-yl]-ethenyl]-3-ethyl-benzthiazolium-tosylate and
2-[2-[2-chloro-3-[2-(1,3-dihydro-1,3,3-trimethyl-2H-indol-2-ylidene)-ethylidene]-1-cyclohexen-1-yl]-ethenyl]-1,3,3-trimethyl-3H-indolium-tosylate.

Also useful IR absorbers for the compositions of the present invention are the following compounds:

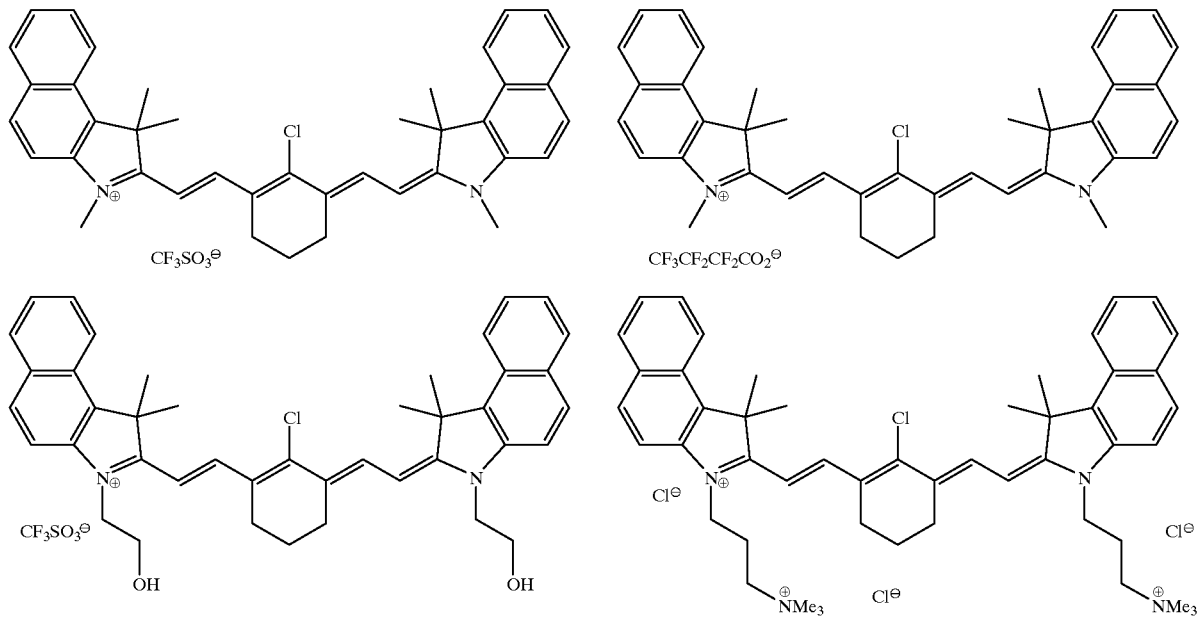

-continued
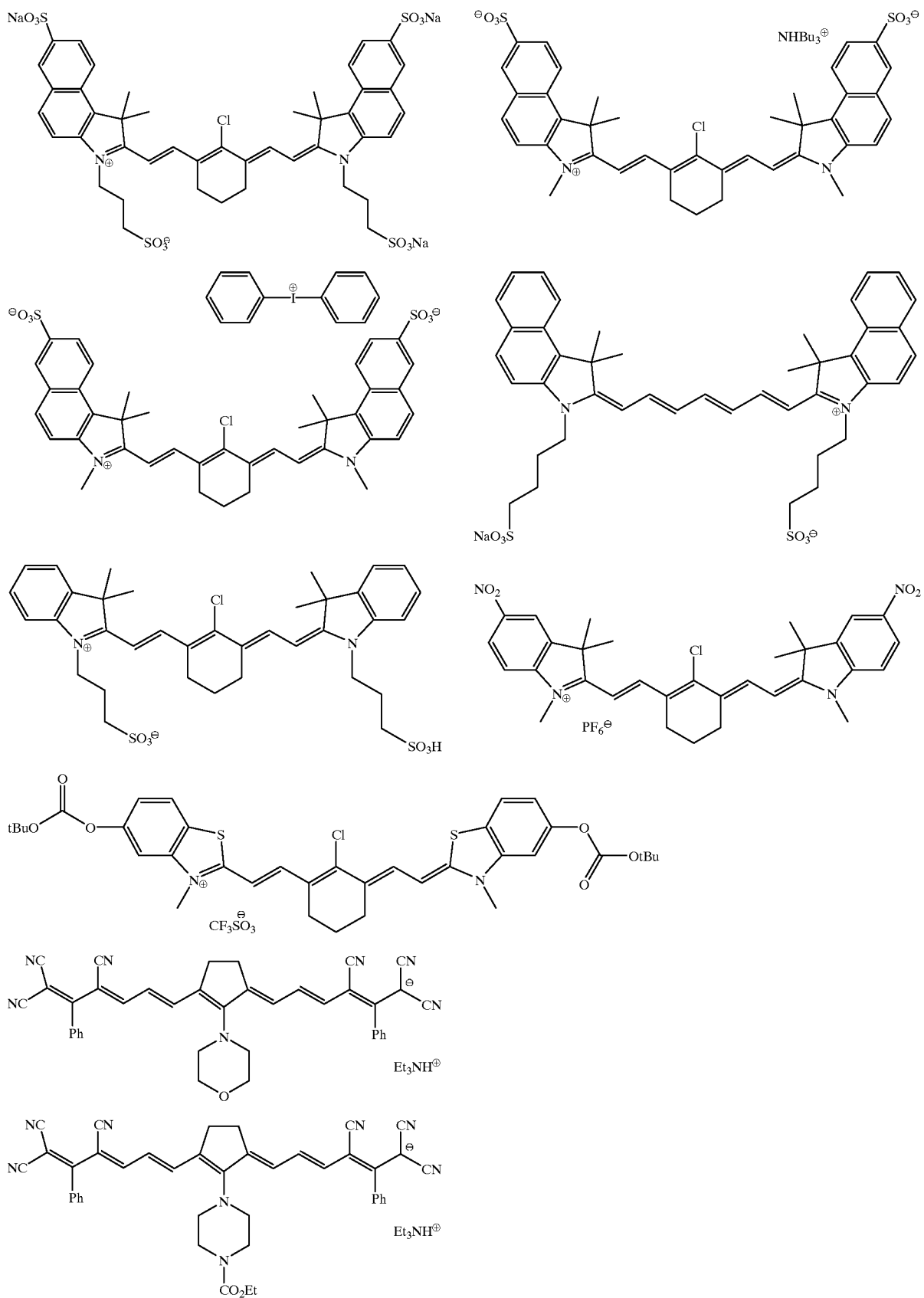

-continued

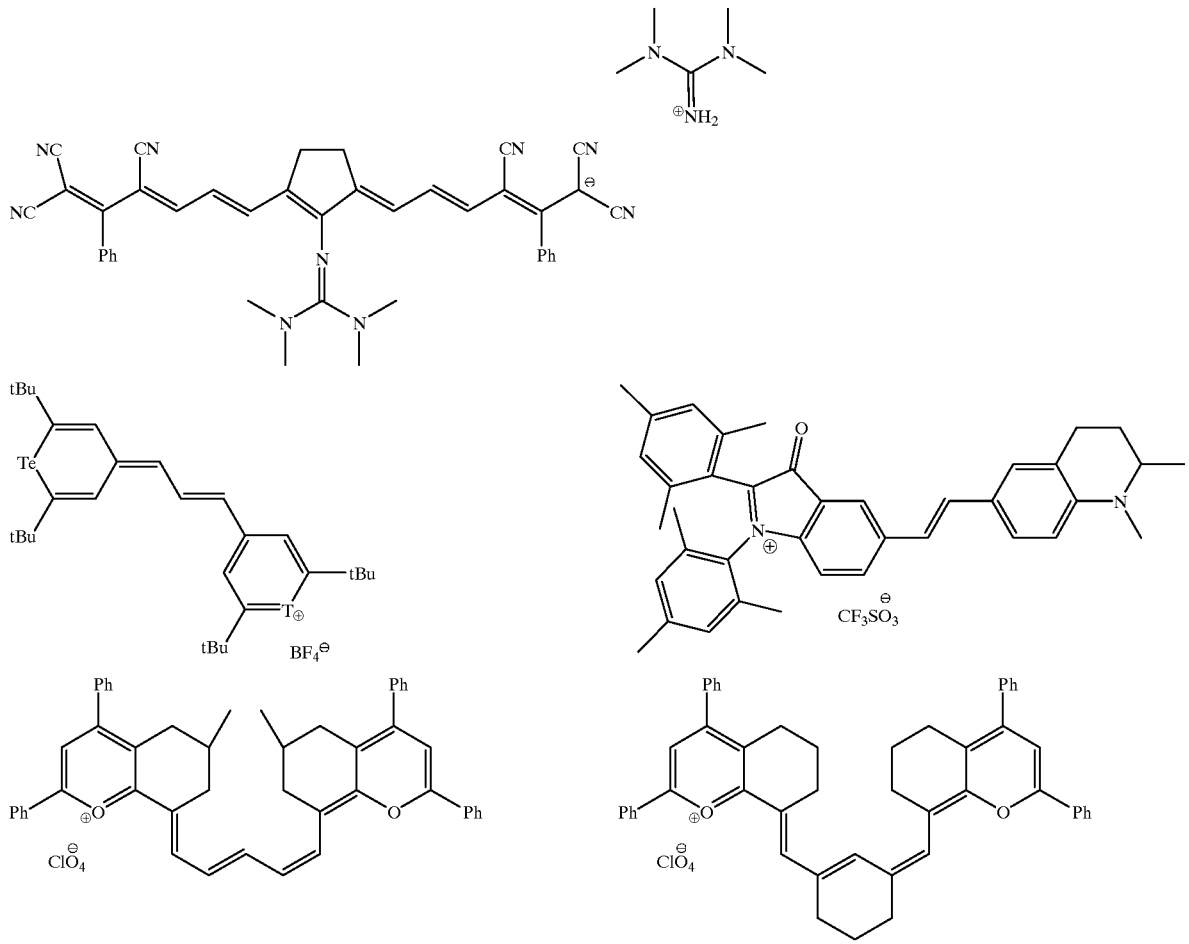

The IR absorber (a) is preferably present in the IR-sensitive composition in an amount of from 1 to 8 wt.-%, based on the total solids content of the IR-sensitive composition; especially preferred is an amount of from 1.5 to 3 wt.-%.

Another essential component of the initiator system is the compound capable of producing radicals. Preferably this compound is selected from polyhaloalkyl-substituted compounds, and azinium compounds. Especially preferred are polyhaloalkyl-substituted compounds; these are compounds which comprise either one polyhalogenated or several monohalogenated alkyl substituents. The halogenated alkyl group preferably has 1 to 3 carbon atoms; especially preferred is a halogenated methyl group.

The absorption properties of the polyhaloalkyl-substituted compound fundamentally determine the daylight stability of the IR-sensitive composition. Compounds having a UV/VIS absorption maximum of >330 nm result in compositions which can no longer be completely developed after the printing plate has been kept in daylight for 6 to 8 minutes and then been reheated. As a principle, such compositions can be imagewise exposed not only with IR but also with UV radiation. If a high degree of daylight stability is desired, polyhaloalkyl-substituted compounds are preferred which do not have a UV/VIS absorption maximum at >330 nm.

The azinium compounds include an azinium nucleus, such as a pyridinium, diazinium, or triazinium nucleus. The azinium nucleus can include one or more aromatic rings, typically carbocyclic aromatic rings, fused with an azinium ring. In other words, the azinium nuclei include quinolinium, isoquinolinium, benzodiazinium, and naphthodiazonium nuclei. To achieve the highest attainable activation efficiencies per unit of weight it is preferred to employ monocyclic azinium nuclei.

A quaternizing substituent of a nitrogen atom in the azinium ring is capable of being released as a free radical upon electron transfer from the photosensitizer to the azinium compound. In one preferred form the quaternizing substituent is an oxy substituent. The oxy substituent (—O—R) which quaternizes a ring nitrogen atom of the azinium nucleus can be selected from among a variety of synthetically convenient oxy substitutents. The moiety R can, for example, be an alkyl radical, which can be substituted; for example aralkyl and sulfoalkyl groups are contemplated. Most preferred oxy substitutents (—O—R) contain 1 or 2 carbon atoms.

Examples of especially suitable compounds (b) for the compositions of the present invention include:
N-methoxy-4-phenyl-pyridinium tetrafluoroborate
tribromomethylphenylsulfone
1,2,3,4-tetrabromo-n-butane
2-(4-methoxyphenyl)4,6bis(trichloromethyl)-s-triazine
2-(4-chlorophenyl)-4,6-bis-(trichloromethyl)-s-triazine
2-phenyl-4,6-bis(trichloromethyl)-s-triazine
2,4,6-tri-(trichloromethyl)-s-triazine
2,4,6-tri-(tribromomethyl)-s-triazine 2-hydroxytetradecyloxyphenyl phenyliodonium hexafluoro-antimonate 2-methoxy-4-phenylaminobenzene diazonium hexafluorophosphate.

Furthermore, the following compounds are useful as initiators (b) in the compositions of the present inventions:

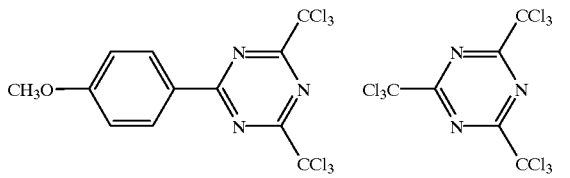
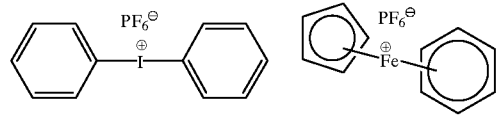
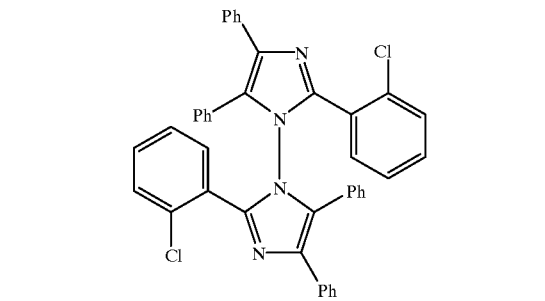
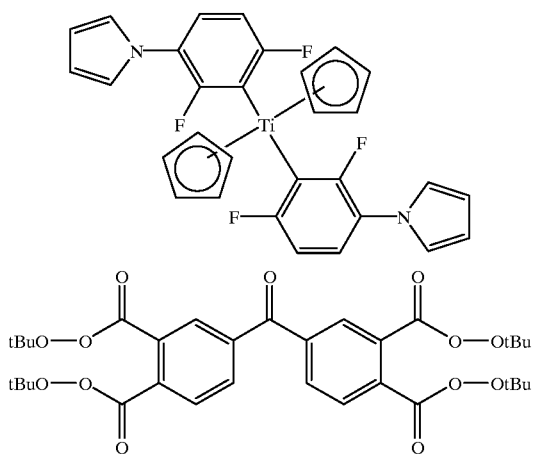
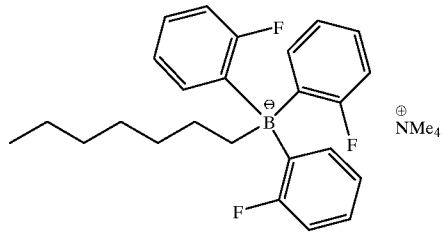
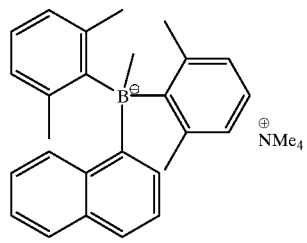
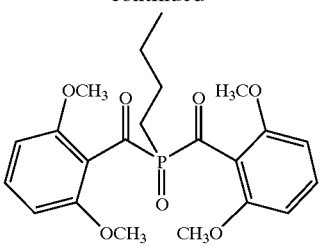

Compound (b) is preferably present in the IR-sensitive composition in an amount of from 2 to 15 wt.-%, based on the total solids content of the IR-sensitive composition; especially preferred is an amount of from 4 to 7 wt.-%.

The polycarboxylic acid (compound c) has an aromatic moiety substituted with a heteroatom selected from N, O and S; it comprises at least two carboxyl groups, at least one of which is bonded to the heteroatom via a methylene group.

Examples of such polycarboxylic acids include:
(p-acetamidophenylimino)diacetic acid
3-(bis(carboxymethyl)amino)benzoic acid
4-(bis(carboxymethyl)amino)benzoic acid
2-[(carboxymethyl)phenylamino]benzoic acid
2-[(carboxymethyl)phenylamino]-5-methoxybenzoic acid
3-[bis(carboxymethyl)amino]-2-naphthalenecarboxylic acid
N-(4-aminophenyl)-N-(carboxymethyl)glycine
N,N'-1,3-phenylenebisglycine
N,N'-1,3-phenylenebis[N-(carboxymethyl)]glycine
N,N'-1,2-phenylenebis[N-(carboxymethyl)]glycine
N-(carboxymethyl)-N-(4-methoxyphenyl)glycine
N-(carboxymethyl)-N-(3-methoxyphenyl)glycine
N-(carboxymethyl-N-(3-hydroxyphenyl)glycine
N-(carboxymethyl)-N-(3-chlorophenyl)glycine
N-(carboxymethyl)-N-(4-bromophenyl)glycine
N-(carboxymethyl)-N-(4-chlorophenyl)glycine
N-(carboxymethyl)-N-(2-chlorophenyl)glycine
N-(carboxymethyl)-N-(4-ethylphenyl)glycine
N-(carboxymethyl)-N-(2,3-dimethylphenyl)glycine
N-(carboxymethyl)-N-(3,4dimethylphenyl)glycine
N-(carboxymethyl)-N-(3,5-dimethylphenyl)glycine
N-(carboxymethyl)-N-(2,4-dimethylphenyl)glycine
N-(carboxymethyl)-N-(2,6-dimethylphenyl)glycine
N-(carboxymethyl)-N-(4-formylphenyl)glycine
N-(carboxymethyl)-N-ethylanthranilic acid
N-(carboxymethyl)-N-propylanthranilic acid
5-bromo-N-(carboxymethyl)anthranilic acid
N-(2-carboxyphenyl)glycine
o-dianisidine-N,N,N',N'-tetraacetic acid
N,N'-[1,2-ethanediylbis(oxy-2,1-phenylene)]bis[N-(carboxymethyl)glycine]
4-carboxyphenoxyacetic acid
catechol-O,O'-diacetic acid
4-methylcatechol-O,O'-diacetic acid
resorcinol-O,O'-diacetic acid
hydroquinone-O,O'-diacetic acid
α-carboxy-o-anisic acid
4,4'-isopropylydenediphenoxyacetic acid
2,2'-(dibenzofuran-2,8-diyldioxy)diacetic acid
2-(carboxymethylthio)benzoic acid
5-amino-2-(carboxymethylthio)benzoic acid
3-[(carboxymethyl)thio]-2-naphtalenecarboxylic acid.

Preferred are N-arylpolycarboxylic acids, in particular those of the following formula (B)

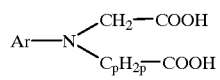

wherein Ar is a mono-, poly- or unsubstituted aryl group and p is an integer from 1 to 5, and of the formula (C)

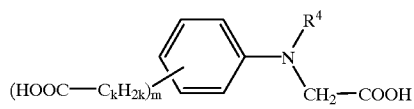

wherein $R^4$ represents a hydrogen atom or a $C_1$–$C_6$ alkyl group and k and m each represent an integer from 1 to 5.

Possible substituents of the aryl group in formula (B) are $C_1$–$C_3$ alkyl groups, $C_1$–$C_3$ alkoxy groups, $C_1$–$C_3$ thioalkyl groups and halogen atoms. The aryl group can have 1 to 3 identical or different substituents. p is preferably 1 and Ar preferably represents a phenyl group.

In formula (C), m is preferably 1 and $R^4$ preferably represents a hydrogen atom. The most preferred polycarboxylic acid is anilino diacetic acid.

The polycarboxylic acid is preferably present in the IR-sensitive composition in an amount of from 1 to 10 wt.-%, especially preferred 1.5 to 3 wt.-%, based on the total solids content of the IR-sensitive composition.

The IR-sensitive composition may furthermore comprise dyes for improving the contrast of the image. Suitable dyes are those that dissolve well in the solvent or solvent mixture used for coating or are easily introduced in the disperse form of a pigment. Suitable contrast dyes include inter alia rhodamin dyes, triarylmethane dyes, methyl violet, anthrachinone pigments and phthalocyanine dyes and/or pigments. The dyes are preferably present in the IR-sensitive composition in an amount of from 1 to 15 wt.-%, especially preferred in an amount of from 2 to 7 wt.-%.

The IR-sensitive compositions of the present invention may furthermore comprise a softening agent. Suitable softening agents include inter alia dibutyl phthalate, triaryl phosphate and dioctyl phthalate. If a softening agent is used, it is preferably present in an amount in the range of 0.25 to 2 wt.-%.

The IR-sensitive compositions of the present invention are preferably usable for the manufacture of printing plate precursors. In addition, however, they may be used in recording materials for creating images on suitable carriers and receiving sheets, for creating reliefs that may serve as printing plates, screens and the like, as radiation-curable varnishes for surface protection and for the formulation of radiation-curable printing inks.

For the manufacture of offset printing plate precursors, conventional carriers can be used; the use of an aluminum carrier is especially preferred. When an aluminum carrier is used it is preferred that it is first roughened by brushing in a dry state, brushing with an abrasive suspension or electrochemically, e.g. in an hydrochloric acid electrolyte; the roughened plates, which were optionally anodically oxidized in sulfuric or phosphoric acid, are then subjected to a hydrophilizing after treatment, preferably in an aqueous solution of polyvinylphosphonic acid or phosphoric acid. The details of the above-mentioned substrate pretreatment are well-known to the person skilled in the art.

The dried plates are then coated with the inventive IR-sensitive compositions from organic solvents or solvent mixtures such that dry layer weights of preferably from 0.5 to 4 g/m², more preferably 0,8 to 3 g/m², are obtained.

On top of the IR-sensitive layer, an oxygen-impermeable layer is applied as it is known in the art, e.g. a layer of polyvinyl alcohol, polyvinyl alcohol/polyvinyl acetate copolymers, polyvinyl pyrrolidon, polyvinyl pyrrolidon/polyvinyl acetate copolymers, polyvinyl methylether, polyacrylic acid and gelatine. The dry layer weight of the oxygen-impermeable layer is preferably 0.1 to 4 g/m², more preferably 0.3 to 2 g/m². This overcoat is not only useful as oxygen barrier but also protects the plate against ablation during exposure to IR radiation.

The thus obtained printing plate precursors are exposed with semiconductor lasers or laser diodes which emit in the range of 800 to 1,100 nm. Such a laser beam can be digitally controlled via a computer, i.e. it can be turned on or off so that an imagewise exposure of the plates can be effected via stored digitalized information in the computer. Therefore, the IR-sensitive compositions of the present invention are suitable for creating what is referred to as computer-to-plate (ctp) printing plates.

After the printing plate precursor has been imagewise exposed, it is briefly heated to a temperature of 85 to 135° C. in order to effect complete curing of the exposed areas. Depending on the temperature applied, this only takes 20 to 100 seconds.

Then the plates are developed as known to the person skilled in the art. The developed plates are usually treated with a preservative ("gumming"). The preservatives are aqueous solutions of hydrophilic polymers, wetting agents and other additives.

The following examples serve to provide a more detailed explanation of the invention.

EXAMPLE 1

A coating solution was prepared from the following components:

| | |
|---|---|
| 3.0 g | Ioncryl 683 ® (acrylic acid copolymer available from SC Johnson & Son Inc. having an acid number of 180 mg KOH/g) |
| 4.4 g | AC 50 ® (methacrylic acid copolymer available from PCAS having an acid number of 48 mg KOH/g, 70 wt. % solution in methyl glycol) |
| 8.4 g | of a 80% methyl ethyl ketone solution of a urethane acrylate prepared by reacting 1-methyl-2,4-bis-isocyanate benzene (Desmodur N100 ® available from Bayer) with hydroxy ethyl acrylate and pentaerythritol triacrylate having a double-bond content of 0.50 double bonds/100 g when all isocyanate groups are completely reacted |
| 1.4 g | dipentaerythritol pentaacrylate |
| 0.75 g | 2-(4-methoxyphenyl)-4,6-bis-(trichlormethyl)-s-triazine |
| 0.3 g | Renol Blue B2G HW ® (copper phthalocyanine pigment preparation with polyvinyl butyral available from Clariant) |
| 0.4 g | anilino diacetic acid |
| 0.25 g | 2-[2-[2-thiophenyl-3-[2-(1,3-dihydro-1,3,3-trimethyl-2H-indol-2-ylidene)-ethylidene]-1-cyclohexen-1-yl]-ethenyl]-1,3,3-trimethyl-3H-indoliumchloride |

These components were dissolved under stirring in 100 ml of a mixture comprising 30 parts by volume methyl glycol 45 parts by volume methanol 25 parts by volume methyl ethyl ketone After filtration, the solution was applied to an electrochemically grained and anodized aluminum foil that was subjected to an after treatment using an aqueous solution of polyvinyl phosphonic acid by means of common methods and the coating was dried for 4 minutes at 90° C. The dry weight of the radiation-sensitive layer amounts to approximately 2 g/m².

Then, an oxygen-impermeable layer of 1.9 g/m² dry layer weight was applied by applying a coating of a solution of the following composition:

| | |
|---|---|
| 50 g | polyvinyl alcohol (Airvol 203 ® available from Airproducts; 12 wt. % residual acetyl groups) |
| 170 g | water. |

Drying took place for 5 minutes at 90° C. All those plates which were only subjected to a temperature treatment for drying the main and the top layer are referred to as fresh plates in the following.

The thus obtained precursor was then exposed in a Trendsetter 3244 of the company Creo with a 830 nm laser diode and a laser energy between 50 and 75 mJ/cm² and then heated to 90° C. for one minute. The exposed and subsequently heated layer was treated for 20 seconds with a developer solution comprising

| | |
|---|---|
| 3.4 parts by weight | Rewopol NLS 28 ® (30% solution of sodium lauryl sulfate in water available from Rewo) |
| 1.8 parts by weight | 2-phenoxy ethanol |
| 1.1 parts by weight | diethanol amine |
| 1.0 parts by weight | Texapon 842 ® (42% solution of octyl sulfate in water available from Henkel) |
| 0.6 parts by weight | Nekal BX Paste ® (sodium salt of an alkyl-naphthalene sulfonic acid available from BASF) |
| 0.2 parts by weight | 4-toluene sulfonic acid |
| 91.9 parts by weight | water. |

Then the developer solution was again rubbed over the surface for another 20 seconds using a tampon and then the entire plate was rinsed with water. After this treatment, the exposed portions remained on the plate while the unexposed portions were completely removed by the developer.

The thus prepared plate was loaded in a sheet-fed offset printing machine and under normal printing conditions provides 130,000 copies of good quality. The plate could be used for more prints.

In order to simulate the solvent resistance of the exposed, subsequently heated and developed layers, the layer loss of a printing plate whose entire surface had been exposed was determined by subjecting it to exemplary solvents at room temperature for one hour. The loss is 5.5 wt.-% in the case of diacetone alcohol and only 2 wt.-% in the case of toluene. These low values indicate a high resistance to solvents.

For determining the IR sensitivity, the plate was exposed with an IR laboratory laser diode KY-538 (wavelength 809 nm, available from Opto Power Corp.). By modifying the electricity supply, the laser performance of the diode can be varied between 50 and 400 mW. The plate was loaded onto a drum which was rotated at a constant speed by means of a motor. By varying the motor power, defined modified rotational speeds could be adjusted. The laser diode was also mechanically moved via a spindle thus forming lines on the plate. This spindle speed could also be adjusted by varying the motor power. By varying the electricity and the rotational speed, the plate was exposed to different degrees of laser energy. The distance between the lines can be modified by different adjustments of the rotational speed and the spindle speed. The IR sensitivity value is the setting of laser diode performance and rotational speed at which un-interrupted lines were obtained for the last time. Thus, the lower the laser performance values and the higher the rotational speed, the higher the IR sensitivity.

After exposure, the plate was again heated to 90° C. for one minute and then developed in the manner described above. The resolution of the lines was good and the non-image areas have been completely removed by the developer also between the lines distanced at 80 µm. The values of the IR sensitivity of the fresh plate are listed in the Table. When the plate was heated to 120° C. for 1 minute after exposure, the same sensitivity values are obtained and the unexposed areas of the plate could be completely removed as well.

For testing the shelf-life of the plates, it is subjected to rapid simulated aging. For that purpose, the plate was heated for 30 minutes to a temperature of 90° C. in an incubator. Then the IR sensitivity of the thus treated plate was determined as described above. The unexposed areas of the plates could be completely removed by the developer. The setting parameters of the IR laser device are listed in the Table. As can be inferred from a comparison with the corresponding values of the fresh plate, the thermal treatment only causes a slight decrease in the IR sensitivity.

In the following, plates that have afterwards been heated for 30 minutes to 90° C. are referred to as aged plates.

The following steps were taken to test the plate's sensitivity towards daylight: On a sunny day, a plate was subjected to daylight in a laboratory with windows of conventional window glass and a cover was shifted off the plates in 2 minute increments. Then the plate was heated to 90° C. for 1 minute and developed using the above-mentioned developer and developing conditions. The resistance to daylight denotes that time period within which no layer residue remains on the plate.

This time period is 28 minutes for the described example.

EXAMPLE 2

Example 1 was repeated except that instead of 2-(4-methoxyphenyl)-4,6-bis(trichloromethyl)-s-triazine 2-phenyl-4,6-bis(trichloromethyl)-s-triazine was used and the coating solution was processed as described in Example 1. The results of the IR sensitivity of the fresh and the aged plates are listed in the Table. The unexposed areas of the aged plate could be removed from the substrate without residue within the listed developing periods. It is obvious that the exchange of the s-triazine derivative does not cause any change in the IR sensitivity values. The plate's resistance to daylight was 38 minutes.

EXAMPLE 3

Example 1 was repeated except that instead of 2-(4-methoxyphenyl)-4,6-bis(tri-chloromethyl)-s-triazine 0.63 g tribromomethylphenylsulfone were used and the coating solution was processed as described in Example 1. The results of the IR sensitivity of the fresh and the aged plates are listed in the Table. The unexposed areas of the aged plate could be removed from the substrate without residue within the listed developing periods. It becomes apparent that the exchange of the s-triazine derivative only causes an insignificant change in the IR sensitivity values while the thermal stability remains the same. The plate's resistance to daylight was 46 minutes.

EXAMPLE 4

Example 1 was repeated except that instead of AC 50® the same amount of the product Terpolymer (methacrylic acid copolymer available from Panchim having an acid number of 130 mg KOH/g) was used and the coating solution was processed as described in Example 1. The results of the IR sensitivity of the fresh and the aged plates are listed in the Table. The unexposed areas of the aged plate could be removed from the substrate without residue within the listed developing periods. It becomes apparent that the exchange of the polymeric binder AC 500® does not lead to a change in the IR sensitivity values.

EXAMPLE 5

The substrate of Example 1 was coated under the same conditions with a coating solution prepared from the following components such that a coating weight of 1.9 g/m² was obtained:

| | |
|---|---|
| 3.0 g | Ioncryl 683 ® (acrylic acid copolymer available from SC Johnson & Son Inc. having an acid number of 180 mg KOH/g) |
| 3.5 g | Elvacite 2670 ® (methacrylic acid copolymer available from DuPont having an acid number of 74 mg KOH/g) |
| 6.3 g | Actilane 110 ® (hexa-functional urethane acrylate of a medium molecular weight available from Akcros) |
| 1.8 g | dimethylol propanetetraacrylate |
| 0.63 g | 2,4,6-tri-(trichloromethyl)-s-triazine |
| 0.3 g | Renol Blue B2G HW ® (copper phthalocyanine pigment preparation with polyvinyl butyral available from Clariant) |
| 0.4 g | anilino diacetic acid |
| 0.25 g | 2-[2-[2-thiophenyl-3-[2-(1,3-dihydro-1,3,3-trimethyl-2H-indol-2-ylidene)-ethylidene]-1-cyclohexen-1-yl]-ethenyl]-1,3,3-trimethyl-3H-indoliumchloride |

The application of the overcoating solution and the further processing of the plate was also carried out as described in Example 1.

The results of the IR sensitivity of the fresh plate are listed in the Table. The unexpose exposed areas of the aged plate could be removed from the substrate without residue within the listed developing periods. It becomes apparent that the exchange of the polymeric binder AC 50® and of the s-triazine derivative as well as the modified monomer or oligomer composition compared to Example 1 do not lead to a change in the IR sensitivity values.

EXAMPLE 6

Example 1 was repeated except that instead of 2-[2-[2-thiophenyl-3-[2-(1,3-dihydro-1,3,3-trimethyl-2H-indol-2-ylidene)-ethylidene]-1-cyclohexen-1-yl]-ethenyl]-1,3,3-trimethyl-3H-indoliumchloride 0,30 g 2-[2-[2-chloro-3-[2 (1,3-dihydro-1,3,3-trimethyl-2H-indol-2-ylidene]-1-cyclohexen-1-yl]-ethenyl]-1,3,3-trimethyl-3H-in-dolium-tosylate were used and the coating solution is processed as described in Example 1. The results of the IR sensitivity of the fresh plate are listed in the Table. The unexposed areas of the aged plate can be removed from the substrate without residue within the listed developing periods. It becomes apparent that the exchange of the IR dye only causes a slight change in the IR sensitivity values.

EXAMPLE 7

Example 1 was repeated except that instead of 2-[2-[2-thiophenyl-3-[2-(1,3-dihydro-1,3,3-trimethyl-2H-indol-2-ylidene)-ethylidene]-1-cyclohexen-1-yl]-ethenyl]-1,3,3-trimethyl-3H-indoliumchloride 0,28 g 2-[2-[2-chloro-3-[2-ethyl-(3H-benzthiazole-2-ylidene)ethylidene]-1-cyclohexen-1-yl]-ethenyl]-3-ethyl-benzthiazolium-tosylate were used and the coating solution was processed as described in Example 1. The results of the IR sensitivity of the fresh plate are listed in the Table. The unexposed areas of the aged plate could be removed from the substrate without residue within the listed developing periods. It becomes apparent that the exchange of the IR dye only causes a slight change in the IR sensitivity values.

TABLE

| Example | | Laser performance (mW) | Rotational speed (cm/s) |
|---|---|---|---|
| 1 | fresh plate | 125 | 250 |
|   | aged plate | 125 | 175 |
| 2 | fresh plate | 125 | 250 |
|   | aged plate | 125 | 175 |
| 3 | fresh plate | 125 | 175 |
|   | aged plate | 125 | 150 |
| 4 | fresh plate | 125 | 250 |
|   | aged plate | 125 | 175 |
| 5 | fresh plate | 125 | 250 |
| 6 | fresh plate | 125 | 175 |
| 7 | fresh plate | 125 | 175 |

EXAMPLE 8

A coating solution was prepared from the following components:

| | |
|---|---|
| 2.44 g | CAP ® (cellulose acetate phthalate from Eastman Kodak Co.) |
| 3.36 g | of an 80% solution of a urethane acrylate prepared by reaction of 1-methyl-2,4-bis-isocyanatobenzene (Desmodur N100 of the Bayer Co.) with hydroxyethyl acrylate and pentaerythritol triacrylate with a double bond content of 0.50 double bonds per 100 g at complete conversion of the isocyanate groups |
| 0.56 g | dipentaerythritol pentaacrylate |
| 0.30 g | 2-(4-methoxyphenyl)-4,6-bis-(trichloromethyl)-s-triazine |
| 0.075 g | Crystal violet (C.I. 42555) |
| 0.16 g | aniline diacetic acid |
| 0.32 g | 2-[2-[2-phenylsulfonyl-3-[2-(1,3-dihydro-1,3,3-trimethyl-2H-indol-2-yliden)-ethylidene]-1-cyclohexene-1-yl]ethenyl]-1,3,3-trimethyl-3H-indolium chloride |

The mentioned components were dissolved, while stirring in 50 ml of the solvent mixture used in Example 1. This solution was in similar fashion coated, dryed and overcoated as outlined in Example 1.

The plate precursor was imaged on a Creo Trendsetter 3244 imagesetter, emitting at 830 nm, with an imaging energy density of 130 mJ/cm² and processed as described in Example 1. 2 to 98% dots were measured with a Gretag D19C Densitometer; this demonstrates that the printing plate has a very good resolving power.

EXAMPLE 9

Example 1 was repeated, but instead of 2-(4-methoxyphenyl)-4,6-bis-(trichloromethyl)-s-triazine 1.3 g 2-hydroxytetradecyloxyphenyl phenyliodonium hexafluoroantimonate were used.

The plate precursor was imaged on a Creo Trendsetter 3244 imagesetter, emitting at 830 nm, with an imaging density of 180 mJ/cm² and processed as described in Example 1. 2 to 98% dots were measured with a Gretag D19C densitometer.

EXAMPLE 10

A coating solution was prepared from the following components:

| | |
|---|---|
| 2.5 g | Scripset 540 ® (butyl semi-ester of maleic anhydride/styrene copolymer of Monsanto Co.) |
| 3.36 g | of an 80% solution of a urethane acrylate prepared by reaction of 1-methyl-2,4-bis-isocyanatobenzene (Desmodur N100 of the Bayer Co.) with hydroxyethyl acrylate and pentaerythritol triacrylate with a double bond content of 0.50 double bonds per 100 g at complete conversion of the isocyanate groups |
| 0.56 g | dipentaerythritol pentaacrylate |
| 0.32 g | 2-methoxy-4-phenylaminobenzenediazonium hexafluorophosphate |
| 0.075 g | Crystal violet (C.I. 42555) |
| 0.16 g | anilino diacetic acid |
| 0.32 g | 2-[2-[2-thiophenyl-3-[2-(1,3-dihydro-1,3,3-trimethyl-2H-indol-2-yliden)-ethylidene]-1-cyclohexene-1-yl]ethenyl]-1,3,3-trimethyl-3H-indolium chloride |

The mentioned components were dissolved, while stirring in 50 ml of the solvent mixture used in Example 1. This solution was in similar fashion coated, dryed and overcoated as outlined in Example 1.

The plate precursor was imaged on a Creo Trendsetter 3244 imagesetter, emitting at 830 nm, with an imaging energy density of 110 mJ/cm$^2$. The exposed plate was heated for 1 min at 90° C. and then developed as described in Example 1.2 to 98% dots were measured with a Gretag D19C Densitometer.

EXAMPLE 11

The coating formulation of Example 1 was modified by replacing the dye 2-[2-[2-thiophenyl-3-[2-(1,3-dihydro-1,3,3-trimethyl-2H-indol-2-ylidene)-ethylidene]1-cyclohexene-1-yl]-ethenyl]-1,3,3-trimethyl-3H-indoliumchloride with 0.33 g dye IRT (Showa Denko K.K., Japan) which belongs to polymethine dyes. The resulting composition was coated, imaged and processed as in Example 1. It was determined that 90 mJ/cm$^2$ were sufficient to retain the original coating thickness.

EXAMPLE 12

A coating solution was prepared from the following components:

| Component | Parts by weight |
|---|---|
| Reaction product of Desmodur N100 with hydroxyethyl acrylate and pentaerythritol triacrylate | 3.56 |
| Joncryl 683 | 1.61 |
| terpolymer (methacrylic acid copolymer available from Pancim having an acid number of 130 mg/KOH/g) | 1.61 |
| Dimethylolpropantetraacrylat | 0.72 |
| 2-(4-methoxyphenyl)-4,6-bis(trichloromethyl)-2-triazine | 0.39 |
| anilino diacetic acid | 0.21 |
| YKR-30A* | 0.13 |
| Crystal Violet | 0.10 |
| Byk 307 | 0.11 |
| MEK | 13.75 |
| toluene | 22.91 |
| 1-methoxy-2-propanol | 54.88 |

*YKR-30A is a soluble phthalocyanine derivative from Yamamoto Chemicals, Inc. which has an absorption maximum at 830 nm.

The solution was applied with a wire-wound rod to electrochemically grained and anodized aluminum which had been post-treated with polyvinylphosphonic acid. After drying, the resulting plate was over-coated with a solution prepared from 5.26 parts of Airvol 203 and 0.93 parts of polyvinylimidazole in 3.94 parts of 2-propanol and 89.87 parts of water. The plate was imaged with a Creo 3244 Trendsefter at 830 nm, heated at 125° C. for about 1 minutes and processed with 953 developer.

EXAMPLE 13

The coating formulation of Example 12 was modified by replacing the YKR-30A dye with 2-[2-[2-thiophenyl-3-[2-(1,3-dihydro-1,3,3-trimethyl-2H-indol-2-ylidene)-ethylidene]-1-cyclohexen-1-yl]ethenyl]-1,3,3-trimethyl-3H-indolium 4-methylbenzenesulfonate and substituting N-methoxy-4-phenylpyridinium tetrafluoroborate for the 2-(4-methoxyphenyl)-4,6bis(trichloromethyl)-2-triazine. The resulting solution was coated, imaged and processed as in Example 12.

Comparative Example 1

(Analogous to U.S. Pat. No. 5,496,903)

| | |
|---|---|
| 3.0 g | Ioncryl 683 ® (acrylic acid copolymer available from SC Johnson & Son Inc. having an acid number of 180 mg KOH/g) |
| 4.4 g | AC 50 ® (methacrylic acid copolymer available from PCAS having an acid number of 48 mg KOH/g, 70 wt. % solution in methylglycol) |
| 8.4 g | of an 80% methyl ethyl ketone solution of a urethane acrylate prepared by reacting 1-methyl-2,4-bis-isocyanate benzene (Desmodur N100 ® available from Bayer) with hydroxy ethyl acrylate and pentaerythritol triacrylate having a double-bond content of 0.50 double bonds/100 g when all isocyanate groups are completely reacted |
| 1.4 g | dipentaerythritol pentaacrylate |
| 0.62 g | 2-(4-methoxyphenyl)-4,6-bis-(trichloromethyl)-s-triazine |
| 0.3 g | Renol Blue B2G HW ® (copper phthalocyanine pigment preparation with polyvinyl butyral available from Clariant) |
| 0.4 g | CGI 7460 ® (alkylammoniumborate available from Ciba Spezialitätenchemie) |
| 0.25 g | 2-[2-[2-thiophenyl-3-[2-(1,3-dihydro-1,3,3-trimethyl-2H-indol-2-ylidene)-ethylidene]-1-cyclohexen-1-yl]-ethenyl]-1,3,3-trimethyl-3H-indoliumchloride |

These components were dissolved under stirring in 100 ml of a mixture comprising 30 parts by volume methyl glycol 45 parts by volume methanol 25 parts by volume methyl ethyl ketone.

After filtration, the solution was applied to an electrochemically grained and anodized aluminum foil that was subjected to an aftertreatment using an aqueous solution of polyvinyl phosphonic acid by means of common methods and the coating was dried for 4 minutes at 90° C. The dry weight of the radiation-sensitive layer amounts to approximately 2 g/m$^2$.

Then an oxygen-impermeable layer of 1.9 g/m$^2$ was applied analogously by means of the coating solution described in Example 1 and the plate was again dried for 5 minutes at 90° C.

After IR laser diode exposure and subsequent heating for 1 minute to 90° C. and developing, only solid areas remained in the exposed areas; lines distanced at 80 $\mu$M were not reproduced. Moreover, the non-image areas showed strong background irregularities due to layer residues. When the exposed plate was heated to 120° C. for 1 minute, development of the plate was no longer possible in the exposed nor the unexposed areas.

An aged unexposed plate could not be developed, either.

These findings show that the replacement of the anilino diacetic acid by an ammonium borate leads to formulations which are extremely thermo-sensitive and can no longer satisfy the shelf-life requirements of IR-sensitive printing plates.

Comparative Example 2

Comparative Example 1 was repeated except that instead of the alkyl ammonium borate the same amount of N-phenylglycine was used and the coating solution was processed as described.

Although lines distanced at 80 μm could be discerned after IR laser diode exposure at a setting of 125 mW and a rotational speed of 230 cm/min, the spaces between the lines still contained cured layer residues. A fresh plate heated at 90° C. for 15 minutes could no longer be developed with the above-mentioned developer.

These findings show that the replacement of the anilino diacetic acid by N-phenylglycine leads to formulations which are extremely thermo-sensitive and therefore cannot fulfill the shelf-life requirements of an IR-sensitive printing plate.

Comparative Example 3

A coating solution was prepared from the following components:

| | |
|---|---|
| 3.15 g | Ioncryl 683 ® (acrylic acid copolymer available from SC Johnson & Son Inc. having an acid number of 180 mg KOH/g) |
| 4.6 g | AC 50 ® (methacrylic acid copolymer available from PCAS having an acid number of 48 mg KOH/g, 70 wt. % solution in methylglycol) |
| 8.8 g | of an 80% methyl ethyl ketone solution of a urethane acrylate prepared by reacting 1-methyl-2,4-bis-isocyanate benzene (Desmodur N100 ® available from Bayer) with hydroxy ethyl acrylate and pentaerythritol triacrylate having a double-bond content of 0.50 double bonds/100 g when all isocyanate groups are completely reacted |
| 1.45 g | dipentaerythritol pentaacrylate |
| 0.3 g | Renol Blue B2G HW ® (copper phthalocyanine pigment preparation with polyvinyl butyral available from Clariant) |
| 0.4 g | anilino diacetic acid |
| 0.25 g | 2-[2-[2-thiophenyl-3-[2-(1,3-dihydro-1,3,3-trimethyl-2H-indol-2-ylidene)-ethylidene]-1-cyclohexen-1-yl]-ethenyl]-1,3,3-trimethyl-3H-indoliumchloride | and processed as described in Example 1 to give a printing plate with a top layer.

At an IR laser diode setting of 360 mW and a rotating speed of 50 cm/min the entire layer was removed by means of a developing agent after subsequent heating. A comparison with Example 1 shows that by leaving out the s-triazine derivative, the sensitivity of the formulation is drastically decreased.

Comparative Example 4

A coating solution was prepared from the following components:

| | |
|---|---|
| 3.1 g | Ioncryl 683 ® (acrylic acid copolymer available from SC Johnson & Son Inc. having an acid number of 180 mg KOH/g) |
| 4.6 g | AC 50 ® (methacrylic acid copolymer available from PCAS having an acid number of 48 mg KOH/g, 70 wt. % solution in methylglycol) |
| 8.7 g | of an 80% methyl ethyl ketone solution of a urethane acrylate prepared by reacting 1-methyl-2,4-bis-isocyanate benzene (Desmodur N100 ® available from Bayer) with hydroxy ethyl acrylate and pentaerythritol triacrylate having a double-bond content of 0.50 double bonds/100 g when all isocyanate groups are completely reacted |
| 1.45 g | dipentaerythritol pentaacrylate |
| 0.3 g | Renol Blue B2G HW ® (copper phthalocyanine pigment preparation with polyvinyl butyral available from Clariant) |
| 0.75 g | 2-(4-methoxynaphthyl-1-yl)-4,6-bis-(trichloromethyl)-s-triazine |
| 0.25 g | 2-[2-[2-thiophenyl-3-[2-(1,3-dihydro-1,3,3-trimethyl-2H-indol-2-ylidene)-ethylidene]-1-cyclohexene-1-yl]-ethenyl]-1,3,3-trimethyl-3H-indoliumchloride | and processed as described in Example 1 to give a printing plate with an overcoating.

The IR sensitivity values of this plate were 200 mW, 150 cm/s, clearly lower than that of the composition of the present invention as described in Example 1. Furthermore, after aging of the plate, it suffered great sensitivity losses (values of the IR laser diode: 280 mW, 100 cm/s). The resistance to daylight is only 6 minutes.

From the Examples it can be inferred that printing plates manufactured with an IR-sensitive composition according to the present invention show a high resistance to developing chemicals and provide a continuously high number of copies. They are furthermore characterized by a long shelf-life and good resistance to daylight as well as a high degree of IR sensitivity and resolving power.

We claim:

1. A composition comprising:
   (a) at least one compound capable of absorbing IR radiation
   (b) at least one compound capable of producing radicals and
   (c) at least one polycarboxylic acid comprising an aromatic moiety substitituted with a heteroatom selected from the group consisting of N, O and S and also at least two carboxyl groups wherein at least one of the carboxyl groups is bonded to the heteroatom via a methylene group.

2. A composition according to claim 1 wherein the compound capable of absorbing IR radiation is selected from the group consisting of triarylamine dyes, thiazolium dyes, indolium dyes, oxazolium dyes, cyanine dyes, polyaniline dyes, polypyrrole dyes, polythiophene dyes and phthalocyanine pigments.

3. A composition according to any one of claim 1 or claim 2 wherein the compound capable of absorbing IR-radiation is a cyanine dye of the formula (A)

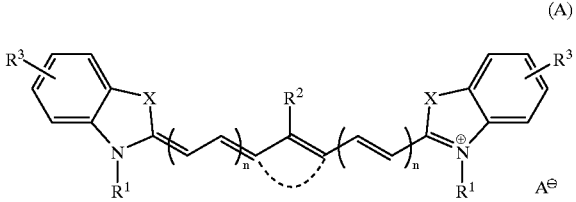

(A)

wherein:
each X independently represents S, O, NR or C(alkyl)$_2$;
each $R^1$ independently is an alkyl group, an alkylsulfonate or an alkylammonium group;

23

$R^2$ represents a hydrogen, halogen, SR, SO$_2$R, OR or NR$_2$;

each $R^3$ independently represents a hydrogen atom, an alkyl group, COOR, OR, SR, NR$_2$, a halogen atom or an optionally substituted benzofused ring;

A$^-$ represents an anion;

- - - represents an optional carbocyclic five- or six-membered ring;

each R independently represents hydrogen, an alkyl or aryl group;

each n independently is 0, 1, 2 or 3.

4. A composition according to claim 3 wherein the compound capable of producing radicals is selected from the group consisting of polyhaloalkyl-substituted compounds and azinium compounds.

5. A composition according to claim 3 wherein the compound capable of absorbing IR radiation is selected from the group consisting of
2-[2-[2-thiophenyl-3-[2-(1,3-dihydro-1,3,3-trimethyl-2H-indol-2-ylidene)-ethylidene]-1-cyclopenten-1-yl]-ethenyl]-1,3,3-trimethyl-3H-indoliumtosylate,
2-[2-[2-phenylsulfonyl-3-[2-(1,3-dihydro-1,3,3-timethyl-2H-indol-2-ylidene) -ethylidene]-1-cyclohexen-1-yl]-ethenyl]-1,3,3-trimethyl-3H-indoliumchloride,
2-[2-[2-thiophenyl-3-[2-(1,3-dihydro-1,3,3-trimethyl-2H-indol-2-ylidene) -ethylidene]-1-cyclohexen-1-yl]-ethenyl]-1,3,3-trimethyl-3H-indoliumchloride,
2-[2-[2-chloro-3-[2-(1,3-dihydro-1,3,3-trimethyl-2H-indol-2-ylidene)-ethylidene]-1-cyclohexen-1-yl]-ethenyl]-1,3,3-trimethyl-3H-indolium-tosylate and
2-[2-[2-chloro-3-[2-ethyl-(3H-benzthiazol-2-ylidene)-ethylidene]-1-cyclohexen-1-yl]-ethenyl]-3-ethyl-benzthiazolium-tosylate.

6. A composition according to claim 3 wherein the compound capable of producing radicals is selected from the group consisting of
N-methoxy-4-phenylpyridinium tetrafluoroborate
2-hydroxytetradecyloxyphenyl phenyliodonium hexafluoroantimonate,
2-methoxy-4-phenylaminobenzene diazonium hexafluorophosphate,
2-phenyl-4,6-bis-(trichloromethyl)-s-triazine,
2-(4-methoxyphenyl)-4,6-bis(trichloromethyl)-s-triazine,
tribromomethylphenylsulfone
2,4,6-tri(trichloromethyl)-s-triazine and
1,2,3,4-tetrabromo-n-butane.

7. A composition according to claim 3 wherein the polycarboxylic acid is a compound of the formula (B)

$$Ar-N\begin{matrix}CH_2-COOH \\ C_pH_{2p}-COOH\end{matrix} \quad (B)$$

wherein Ar represents a mono-, poly- or unsubstituted aryl group and p is an integer from 1 to 5 or of the formula (C)

(C)

(HOOC—C$_k$H$_{2k}$)$_m$—[ring]—N(R$^4$)—CH$_2$—COOH wherein $R^4$ represents a hydrogen atom or a $C_1$–$C_6$ alkyl group, and k and m each are an integer from 1 to 5.

24

8. A composition according to claim 3 wherein the polycarboxylic acid is anilino diacetic acid.

9. IR-sensitive composition according to claim 3 further comprising a polymeric binder and at least one component selected from the group consisting of unsaturated free radical polymerizable monomers, oligomers which are free radical polymerizable and polymers having C═C bonds in the back bone and/or in the side chain groups.

10. Composition according to claim 9 additionally comprising at least one dye for increasing the contrast of the image.

11. Printing plate precursor comprising coating with a composition according to claim 9 and an oxygen-impermeable overcoating.

12. A method for providing an image, comprising:

(a) coating an optionally pretreated substrate with an IR-sensitive composition as defined in claim 9 and subsequently coating with an oxygen-impermeable overcoating, (b) imagewise exposing the printing plate precursor obtained in step (a) to IR radiation (c) optionally subjecting the treated precursor of step (b) to a heating step and (d) subsequently developing the precursor with an aqueous developer to obtain a printable lithographic printing plate.

13. A composition according to any of claim 1 or claim 2, wherein the compound capable producing radicals is selected from the group consisting of polyhaloalkyl-substituted compounds and azinium compounds.

14. A composition according to claim 13 wherein the compound capable of absorbing IR radiation is selected from the group consisting of
2-[2-[2-thiophenyl-3-[2-( 1,3-dibydro-1,3,3-trimethyl-2H-indol-2-ylidene)-ethyliden]-1-cyclopenten-1-yl]-ethenyl]-1,3,3-trihethyl-3H-indoliumtosylate,
2-[2-[2-phenylsulfonyl-3-[2-(1,3dihydro-1,3,3-trimethyl-2H-indol-2-ylidene)-ethylidene]-1-cyclohexen-1-yl]-ethenyl]-1,3,3-trimethyl-3H-indoliumchloride,
2-[2-[2-thiophenyl-3-[2-(1,3-dihydro-1,3,3-trimethyl-2H-indol-2-ylidene)-ethylide]-1-cyclohexen-1-yl]-ethenyl]-1,3,3-trimethyl-3H-indoliumchloride,
2-[2-[2-chloro-3-[2-(1,3-dihydro-1,3,3-trimethyl-2H-indol-2-ylidene)-ethylidene]-1-cyclohexen-1-yl]-ethenyl]-1,3,3-trimethyl-3H-indolium-tosylate and
2-[2-[2-chloro-3-[2-ethyl-(3H-benzthiazol-2-ylidene)-ethylidene]-1-cyclohexen-1-yl]ethenyl]-3-ethyl-benzthiazolium-tosylate.

15. A composition according to claim 13 wherein the compound capable of producing radicals is selected from the group consisting of
N-methoxy-4-phenylpyridinium tetrafluoroborate
2-hydroxytetradecyloxyphenyl phenyliodonium hexafluoroantimonate,
2-methoxy-4-phenylaminobenzene diazonium hexafluorophosphate,
2-phenyl-4,6-bis-(trichloromethyl)-s-triazine,
2-(4-methoxyphenyl)-4,6bis(trichloromethyl)-s-triazine,
tribromomethylphenylsulfone
2,4,6-tri(trichloromethyl)-s-triazine and
1,2,3,4-tetrabromo-n-butane.

16. A composition according to claim 13 wherein the polycarboxylic acid is a compound of the formula (B)

(B)

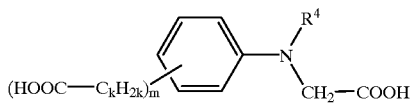

wherein Ar represents s mono-, poly- or unsubstituted aryl group and p is an integer from 1 to 5 or the formula (C)

(C)

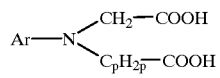...

wherein $R^4$ represents a hydrogen atom or a $C_1$–$C_6$ alkyl group, and k and m each are an integer from 1 to 5.

17. A composition according to claim 13 wherein the polycarboxylic acid is anilino diacetic acid.

18. IR-sensitive composition according to claim 3 further comprising a polymeric binder and at least one component selected from the group consisting of unsaturated free radical polymerizable monomers, oligomers which are free radical polymerizable and polymers having C=C bonds in the back bone and/or in the side chain groups.

19. Composition according to claim 18 additionally comprising at least one dye for increasing the contrast of the image.

20. Printing plate precursor comprising coating with a composition according to claim 18 and an oxygen-impermeable overcoating.

21. A method for providing an image, comprising:
(a) coating an optionally pretreated substrate with an IR-sensitive composition as defined in claim 18 and subsequently coating with an oxygen-impermeable overcoating,
(b) imagewise exposing the printing plate precursor obtained in step (a) to IR radiation
(c) optionally subjecting the treated precursor of step (b) to a heating step and
(d) subsequently developing the precursor with an aqueous developer to obtain a printable lithographic printing plate.

22. A composition according to any of claim 1 or claim 2, wherein the compound capable of absorbing IR radiation is selected from the group consisting of
2-[2-[2-thiophenyl-3-[2-(1,3-dihydro-1,3,3-trimethyl-2H-indol-2-ylidene)-ethylide]-1-cyclopenten-1-yl]-ethenyl]-1,3,3-trimethyl-3H-indoliumtosylate,
2-[2-[2-phenylsulfonyl-3-[2-(1,3-dihydro-1,3,3-trimethyl-2H-indol-2-ylidene)-ethylidene]-1-cyclohexen-1-yl]-ethenyl]-1,3,3-trimethyl-3H-indoliumchloride,
2-[2-[2-thiophenyl-3-[2-(1,3-dihydro-1,3,3-trimethyl-2H-indol-2-ylidene)-ethylidene]-1-cyclohexen-1-yl]-ethenyl]-1,3,3-trimethyl-3H-indoliumchloride,
2-[2-[2-chloro-3-[2-(1,3-dihydro-1,3,3-trimethyl-2H-indol-2-ylidene)-ethylidene]-1-cyclohexen-1-yl]-ethenyl]-1,3,3-trimethyl-3H-indolium-tosylate and
2-[2-[2-chloro-3-[2-ethyl-(3H-benzthiazol-2-ylidene)-ethylidene]-1-cyclohexen-1-ethenyl]-3-ethyl-benzthiazolium-tosylate.

23. A composition according to any of claim 1 or claim 2, wherein the compound capable of producing radicals is selected from the group consisting of
N-methoxy-4-phenylpyridinium tetrafluoroborate
2-hydroxytetradecyloxyphenyl phenyliodonium hexafluoroantimonate,
2-methoxy-4-phenylaminobenzene diazonium hexafluorophosphate,
2-phenyl-4,6-bis-(trichloromethyl)-s-triazine,
2-(4-methoxyphenyl)-4,6-bis(trichloromethyl)-s-triazine,
tribromomethylphenylsulfone
2,4,6-tri(trichloromethyl)-s-triazine and
1,2,3,4-tetrabromo-n-butane.

24. A composition according to any claim 1 or claim 2, wherein the polycarboxylic acid is a compound of the formula (B)

(B)

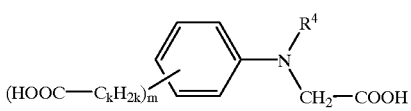

wherein Ar represents a mono-, poly- or unsubstituted aryl group and p is an integer from 1 to 5 or of the formula (C)

(C)

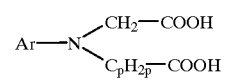

wherein $R^4$ represents a hydrogen atom or a $C_1$–$C_6$ alkyl group, and k and m each are an integer from 1 to 5.

25. A composition according to any of claim 1 or claim 2, wherein the polycarboxylic acid is anilino diacetic acid.

26. IR-sensitive composition comprising:
(i) a free radical polymerizable system comprising a composition of any one of claim 1 or 2 and at least one component selected from the group consisting of unsaturated free radical polymerizable monomers, oligomers which are free radical polymerizable and polymers having C=C bonds in the back bone and/or in the side chain groups and
(ii) a polymeric binder.

27. Composition according to claim 26, additionally comprising at least one dye for increasing the contrast of the image.

28. Composition according to claim 27 wherein the polymeric binder has an acid number of >70 mg KOH/g.

29. Composition according to claim 26, wherein the polymeric binder has an acid number of >70 mg KOH/g.

30. Printing plate precursor, comprising a coating with a composition according to claim 26 and an oxygen-impermeable overcoating.

31. Printing plate, obtained from the printing plate precursor of claim 30 by image wise exposure to IR radiation, an optional heating step and a subsequent developing step.

32. A method for providing an image, comprising:
(a) coating an optionally pretreated substrate with an IR-sensitive composition as defined in claim 26 and subsequently coating with an oxygen-impermeable overcoating,
(b) imagewise exposing the printing plate precursor obtained in step (a) to IR radiation
(c) optionally subjecting the treated precursor of step (b) to a heating step and
(d) subsequently developing the precursor with an aqueous developer to obtain a printable lithographic printing plate.

* * * * *

UNITED STATES PATENT AND TRADEMARK OFFICE
CERTIFICATE OF CORRECTION

Page 1 of 3

PATENT NO. : 6,309,792 B1
DATED : October 30, 2001
INVENTOR(S) : Hauck et al.

It is certified that error appears in the above-identified patent and that said Letters Patent is hereby corrected as shown below:

Column 4,
Line 27, "slighty" should read -- slightly --
Line 58, "tetracrylate" should read -- tetraacrylate --

Column 9,
Third compound, "T⊕" should read -- Te⊕ --

Column 10,
Line 53, "substitutents." should read -- substituents. --
Line 56, "substitutents" should read -- substituents --
Line 63, "-4,6bis" should read -- -4,6-bis --
Line 63, "bis(trichloromethyl)-" should read -- bis-(trichloromethyl)- --
Line 65, "bis(trichloromethyl)-" should read -- bis-(trichloromethyl)- --

Column 12,
Line 42, "(3,4dimethylphenyl)" should read -- (3,4-dimethylphenyl) --
Line 65, "-naphtalenecarboxylic" should read -- -napthalenecarboxylic --

Column 13,
Line 36, "chinone" should read -- quinone --

Column 14,
Line 6, "pyrrolidon" (both occurrences) should read -- pyrrolidone --
Line 8, "gelatine." should read -- gelatin. --
Line 18, "digitalized" should read -- digitized --
Line 51, "(trichlormethyl)" should read -- (trichloromethyl) --
Line 66, "after treatment" should read -- aftertreatment --

Column 15,
Line 67, "un-interrupted" should read -- uninterrupted --

Column 16,
Line 30, "(tri-chlormethyl)" should read -- (trichloromethyl) --

Column 17,
Line 35, "unexpose exposed" should read -- unexposed --
Line 47, "0,30" should read -- 0.30 --
Line 49, "in-dolium" should read -- indolium --
Line 63, "0,28" should read -- 0.28 --

UNITED STATES PATENT AND TRADEMARK OFFICE
CERTIFICATE OF CORRECTION

PATENT NO. : 6,309,792 B1
DATED : October 30, 2001
INVENTOR(S) : Hauck et al.

It is certified that error appears in the above-identified patent and that said Letters Patent is hereby corrected as shown below:

Column 18,
Line 38, "-cyclohexene-" should read -- -cyclohexen- --
Line 45, "dryed" should read -- dried --

Column 19,
Line 17, "-cyclohexene-" should read -- cyclohexen- --
Line 23, "dryed" should read -- dried --
Line 35, "-cyclohexene-" should read -- cyclohexen- --
Line 54, "Dimethylolpropanetetraacylat" should read
-- Dimethylolpropanetetraacyl*ate* --

Column 20,
Line 5, "Trendsefter" should read -- Trendsetter --
Line 5, "minutes" should read -- minute --
Line 15, "-4,6bis" should read -- -4,6-bis --
Line 15, "bis(trichloromethyl)-" should read -- bis-(trichloromethyl)- --

Column 22,
Line 16, "-cyclohexene-" should read -- cyclohexen- --
Line 40, "substitituted" should read -- substituted --

Column 23,
Line 10, "group;" should read -- group; and --
Line 23, "-timethyl-" should read -- -trimethyl- --
Line 34, "benztbiazolium-" should read -- benzthiazolium- --
Line 44, "-bis(trichloromethyl)-" should read -- -bis-(trichloromethyl)- --
Line 46, "-tri(trichloromethyl)-" should read -- -tri-(trichloromethyl)- --

Column 24,
Line 37, "-dihybro-" should read -- -dihydro- --
Line 38, "-ethyliden]-" should read -- -ethylidene]- --
Line 39, "-trihethyl-" should read -- -trimethyl- --
Line 40, "-(1,3dihydro-" should read -- -(1,3-dihydro- --
Line 44, "-ethylide]-" should read -- -ethylidene]- --
Line 62, "-4,6bis" should read -- -4,6-bis --
Line 62, "bis(trichloromethyl)-" should read -- bis-(trichloromethyl)- --
Line 64, "-tri(trichloromethyl)-" should read -- -tri-(trichloromethyl)- --

UNITED STATES PATENT AND TRADEMARK OFFICE
CERTIFICATE OF CORRECTION

PATENT NO. : 6,309,792 B1
DATED : October 30, 2001
INVENTOR(S) : Hauck et al.

It is certified that error appears in the above-identified patent and that said Letters Patent is hereby corrected as shown below:

Column 25,
Line 20, "claim 3" should read -- claim 13 --
Line 48, "-ethylide]-" should read -- -ethylidene]- --
Line 60, "-cyclohexen-1-ethenyl]-" should read -- -cyclohexen-1-yl]-ethenyl] --

Column 26,
Line 4, "bis(trichloromethyl)-" should read -- bis-(trichloromethyl)- --
Line 6, "-tri(trichloromethyl)-" should read -- -tri-(trichloromethyl)- --
Line 51, "image wise" should read -- imagewise --

Signed and Sealed this

Twenty-first Day of May, 2002

Attest:

Attesting Officer

JAMES E. ROGAN
Director of the United States Patent and Trademark Office